United States Patent Office 3,459,700
Patented Aug. 5, 1969

3,459,700
THERMOSETTING INTERPOLYMERS
Harry F. Richards, Walnut Creek, Calif., assignor to Shell Oil Company, New York, N.Y., a corporation of Delaware
No Drawing. Filed Oct. 22, 1964, Ser. No. 405,853
Int. Cl. C08f 33/08, 45/28
U.S. Cl. 260—33.6                                10 Claims

ABSTRACT OF THE DISCLOSURE

A thermosetting resinous transparent polymer made by interpolymerizing with a free radical catalyst from 20 to 60% of a block copolymer having the general configuration

A—B—A wherein each A is a polymer block of a monovinyl aromatic hydrocarbon and B is a polymer block of a conjugated diene with from 80–40% by weight of a monomeric monovinyl aromatic hydrocarbon.

---

This invention is concerned with improved thermosetting interpolymers. More particularly, it is directed to the preparation of interpolymers between vinyl-substituted arenes and block copolymers, said interpolymers having thermosetting properties.

The need for relatively inexpensive thermosetting radical-cured binders for coatings, laminating adhesives, and many other purposes has not been completely satisfied even by the great variety of polymeric materials known at this time. The essential quality beyond that of thermosetting which would be either highly desirable or even essential for many purposes is that of flexibility and elasticity which most thermosetting substances lack almost completely.

The alteration of properties of polystyrene with various elastomers to produce interpolymers generically referred to as "high impact polystyrene" satisfies a certain part of this demand, but, due to the relatively low proportion of elastomer falls short of the desire for flexibility and also does not have the thermosetting feature, the product being a thermoplastic.

It is an object of the present invention to provide improved thermosetting products. It is a particular object of the invention to provide improved thermosetting products having a striking set of properties normally associated with elastomers. It is a further object of the invention to provide improved adhesives, coatings, moldings, and extrusions as well as binders. Other objects will become apparent during the following description of the invention.

Now, in accordance with the present invention, improved thermosetting resinous transparent polymeric compositions are provided comprising a free radical catalytically interpolymerized solution of 20–60% by weight of a block copolymer having the general configuration

A—B—A wherein each A is a polymer block of at least one monovinyl aromatic hydrocarbon and B is a polymer block of a conjugated diene, or hydrogenated derivatives of such block copolymers and 80–40% by weight of at least one monomeric monovinyl aromatic hydrocarbon.

Still in accordance with this invention, a method is provided for preparing such interpolymers which comprises dissolving the block copolymer in the monomeric monovinyl aromatic hydrocarbon and heating the solution so formed at a temperature between about 20° C. and 200° C. for 0.1–24 hours in the presence of a free radical catalyst to produce a thermosetting crosslinked product. In further accordance with the invention, modified thermosetting resins of the above type contain in interpolymerized addition 5–40% by weight of a hydroxyalkyl ester of an acrylic acid. Still further aspects of the invention comprise extension of the interpolymers so formed with plasticizers such as 1–50% by weight of mineral oils, the oil being selected dependent upon the desire to provide strip coating types of materials or compatible compositions. One aspect of the invention comprises the unexpected discovery that the interpolymers of this invention adhere with unaccountable strength to the surface of aluminum articles even in the absence of any special treatment of the aluminum.

The properties of the subject interpolymers are substantially superior in a number of respects to corresponding polymers prepared from allied materials. For example, interpolymers prepared by the use of heteric copolymers of styrene and butadiene (instead of block copolymers) interpolymerized with styrene have substantially poorer yield, tensile strength, and elongation than those of the present invention. Moreover, the interpolymers of this invention are substantially improved over corresponding physical mixtures of the same components, as will be seen from the comparative data contained in the working examples given hereinafter.

The new compositions are transparent polymeric materials of a wide variety of physical characteristics, dependent in part upon the proportions of block copolymer and of vinyl substituted aromatic hydrocarbon employed in the interpolymerization and upon the proportion of free radical catalyst utilized for the interpolymerization.

It is important that the block copolymer of diene and vinyl arene be soluble or at least highly swellable in the monomeric monovinyl aromatic hydrocarbon to form a solution or colloidal dispersion of the block copolymer that is free (or substantially free) from gels which are visible to the naked eye. The presence or absence of such gels in the solution or dispersion can conveniently be determined by passing the solution through a Number 1 Grade Watman filter paper. The visable gel particles, if present, are retained on the filter paper.

While the block copolymers to be utilized in the present invention may have from 2 to 40 alternating vinylarene and diene polymer blocks, the preferred copolymers have the general configuration.

A—B—C wherein A is a polymer block of a vinylarene, B is a polymer block of a conjugated diene and C is either a polymer block of a vinylarene or a monomeric polymer terminating radical such as hydrogen, methyl, methoxyl, hydroxyl, carboxyl, carbonyl, sulfhydryl, etc. Thus, the two general preferred types of block copolymers considered here may be said to be either 3-block copolymers or 2-block copolymers.

The vinylarenes utilized in the preparation of these copolymers are typified by styrene but may be substituted styrenes such as alpha methyl styrene, ring methylated styrenes or vinyl naphthalenes. The conjugated dienes utilized in the formation of the polymer block B preferably have from 4–8 carbon atoms per molecule of which butadiene and isoprene are typical and preferred.

The methods by which these block copolymers are formed do not comprise an essential part of the present invention. Briefly, however, they usually are formed in their most desired molecular weight range by the use of alkali metal-containing organo catalysts capable of forming "living polymers," the several types of monomers being injected into the system in succession. Thus, when utilizing lithium based catalysts such as alkyl lithium, it is preferred to form the first polymer block by the use of styrene; allowing substantially all of the styrene to polymerize and form a living polymer block, after which a conjugated diene such as butadiene is injected into the system; continuing polymerization to form the polymer block B thereof; and either terminating the polymerization by the addition of methanol, water, oxygen, or the like, or injecting a further quantity of vinylarene to form polymer block C.

Block copolymers of more intricate structure are obtained by continuing polymerization with alternating introduction of the two types of monomers to form successive blocks A—B—A—B—A— etc.

having an average molecular weight between about 65,000 and about 750,000.

In order to be most effective for the formation of the subject interpolymers, the blocks A should have average molecular weights between about 5,000 and 60,000 while the conjugated diene block B should have an average molecular weight between about 5,000 and 500,000. The most effective block copolymers should have between 2 and about 40% by weight of vinylarene polymer blocks and the intrinsic viscosity measured in toluene at room temperature should be between about 1 and 5 dl./g.

A special type of block copolymer may be provided for use in these interpolymerizations wherein at least 75% of the diene linkages are hydrogenated but no more than about 25% of the vinylarene portions of the block are hydrogenated. Such block polymers are exceptionally stable to heat and oxidation (because of the reduction of diene linkages) but are still highly compatible with the main component of the interpolymer, namely, the vinylarene, since the vinylarene polymer blocks are reduced only to a minor extent.

The interpolymers of the present invention may comprise as a major component, condensed units of vinylarenes such as styrene, which is preferred, as well as alkyl-substituted styrenes including alpha-methyl styrene and ring substituted alkylated styrenes.

The methods for making the subject interpolymers may comprise either solution polymerization or bulk polymerization procedures. The proportion of free radical catalysts employed will depend in large measure upon the identity and proportion of each of the components taking part in the interpolymerization as well as upon the desired properties of the interpolymerized thermosetting product. The free radicals produced by catalyst decomposition can either add to the styrene type of monomer leading to the formation of polystyrene and styrene-block copolymer interpolymers or they can abstract protons from vulnerable positions on the block copolymer. The resulting radicals either couple or attach to a growing polystyrene radical, producing crosslinked block copolymer and polystyrene grafted onto the block copolymer. With increasing catalyst concentration, the grafting and crosslinking reactions increase in magnitude resulting in the thermosetting properties of the system. The pendant vinyl groups on the block copolymer are less reactive than styrene and the relative concentration of styrene monomer to block copolymer determines the amount and composition of the styrene-block copolymer interpolymerized product.

The modification of the interpolymerization system with a hydroxyalkyl ester of an acrylic acid results in a similar interpolymerization process since the ester readily copolymerizes with styrene and the block copolymer. Evidence has also been obtained that radical attack occurs at the pendant hydroxyl group leading to the formation of a new radical which undergoes branching, grafting, and crosslinking reactions. The net effect is an increase in crosslinking density.

In the alternative interpolymers containing interpolymerized hydroxyalkyl esters of acrylic acids, it is preferred that the hydroxyalkyl radical contain from 2–5 carbon atoms. Typical of these are hydroxyethyl methacrylate, hydroxypropyl methacrylate, hydroxyamyl methacrylate, as well as the corresponding acrylates. The utilization of the hydroxyalkyl acrylic acid esters results in improved properties of the interpolymers for adhesive and surface coating applications due in part to the polar radicals forming a part of the interpolymer.

In the interpolymerization process, the proportion of free radical catalysts may be varied from about 0.01% to about 4% based on the interpolymerizing components. Typical catalysts for this purpose include hydrogen peroxide, benzoyl peroxide, tertiary butyl hydroperoxide, cumene hydroperoxide, dicumyl peroxide, potassium persulfate, and azo compounds such as azoisobutylnitrile as well as their analogs and homologues.

Temperatures of interpolymerization may vary from about 20° C. to 200° C. for 0.1–24 hours. Accelerators such as metal driers (cobalt, lead, or manganese soaps) may be present. Preferred compositions comprise:

|  | Parts by weight |
| --- | --- |
| Block copolymer | 10–50 |
| Ester | 5–30 |
| Styrene (or equivalent) | 20–80 |

The polymerization is conducted either as a bulk polymerization or with the aid of solvents as long as the solvents do not materially take part in the interpolymerization product, but merely act as a viscosity reducing medium. Emulsion processes may be utilized as well, but solution or bulk processes are preferred. Stirring at least in the initial stages of the process are preferred but as the viscosity of the product increases upon polymerization, the benefits of continued stirring gradually decrease and become less effective.

One of the most striking properties of the interpolymers of this invention and especially of those containing the hydroxyalkyl methacrylate components is their unique adhesion to aluminum even when the metal has not been pre-treated to improve its coating reception properties. The bond is extremely resistant to tearing and pulling and it is possible that this arises from the surface active properties of pendant hydroxyl groups. This thermoset coating, particularly one which may be oil modified, that adheres to aluminum without an exhaustive and expensive pre-treatment of the aluminum surface, offers many possibilities of application in aluminum forms for concrete trucks, construction siding and many other end uses.

This adhesive property is also noteworthy in connection with the formation of laminates with polyolefins such as polypropylene, polyethylene, and ethylene-propylene copolymers. Thus, it is possible to form laminates not only of multiple sheets of polyolefins but of polyolefins to aluminum or to other metals wherein the subject interpolymers of the present invention form the adhesive bonds between the two layers.

The thermosetting interpolymers of this invention are particularly useful for a number of purposes wherein thermosetting properties are desirable or essential and at the same time wherein elastomeric properties are useful at least to a limited extent. Thus, the basic compositions are indicated for use as moldings, extrusions, binders, and films, while those modified by the presence of hydroxyalkyl esters of acrylic acid are further indicated for use as adhesives, surface coatings, and laminate bonding layers. Not only may the compositions be extruded by any desirable means or molded by the usual molding equipment utilized for shaping of thermosetting polymers, but the interpolymers may be employed for the modification of other substances such as the improvement in properties of natural or synthetic rubbers including polyisoprene, polybutadiene, styrene-butadiene copolymers (SBR) and mixtures thereof.

The following examples illustrate preferred aspects of this invention:

Example I

A block copolymer was prepared having the configuration polystyrene-polybutadiene-polystyrene the block molecular weights being 13,000—44,000—13,000. This block copolymer was dissolved in styrene containing 0.1 weight percent dicumyl peroxide, the ratio of styrene and block copolymer being varied as shown in Table I below. The compositions were cured at 150° C. for one hour. Table I below shows the variation in properties obtained by altering the ratio of styrene monomer to the block copolymer.

Example II

Comparison was made between compositions according to the present invention which are interpolymers, and interpolymers prepared with other polymeric materials and styrene as well as with a physical mixture of polystyrene with the block copolymers. Table II shows the advantages of the present invention in the mechanical properties at 23° C. of the interpolymers of this invention compared with these allied compositions. All of the interpolymers given in Table II were prepared with the use of 0.1% by weight of dicumyl peroxide, the styrene monomer and the individual polymeric elastomers being cured at 150° C. for one hour. A constant ratio of 70% by weight of styrene and 30% by weight of polymer was employed in each of these samples.

TABLE II

| Resin | Yield, p.s.i. | Tensile at break, p.s.i. | Elongation percent at break | Hardness Shore "D" |
|---|---|---|---|---|
| Polystyrene-polybutadiene-polystyrene | 3,350 | 2,200 | 170 | 57 |
| Polystyrene-polyisoprene-polystyrene | 2,120 | 1,655 | 75 | 59 |
| Polybutadiene(styrene-butadiene)-polystyrene | 1,512 | 1,324 | 250 | 53 |
| Styrene-butadiene random, copolymer, 80% butadiene | 750 | 1,850 | 85 | 42 |
| Polyisoprene | 700 | 2,325 | 500 | 31 |
| Polybutadiene | 500 | 2,325 | 260 | 33 |
| Physical mixture | 1,890 | 1,690 | 105 | 64 |

Example III

The effect of oil extension of the subject interpolymers is shown in the Table III below. The extending oil was a hydro-treated medium viscosity index mineral oil. The block copolymer was that employed in Example I above.

TABLE I.—STYRENE-BLOCK COPOLYMER RESINS

| | | Mechanical properties [1] | | | |
|---|---|---|---|---|---|
| Sample | Styrene, percent, w. | Block copolymer, percent w. | Yield strength (p.s.i.) | Tensile at break (p.s.i.) | Elongation percent at break | Hardness Shore "D" |
| A | 50 | 50 | 1,380 | 2,615 | 240 | 49 |
| B | 60 | 40 | 2,250 | 2,900 | 375 | 50 |
| C | 70 | 30 | 3,350 | 2,200 | 170 | 57 |
| D | 80 | 20 | 3,450 | 3,830 | 125 | 73 |
| E | 90 | 10 | [2] 560 | | <1 | 75 |
| F | | 100 | 220 | 3,200 | 750 | 20 |

[1] Tensile data were obtained on "D"-die specimens of approximately 60 mil thickness using an Instron Tester with a cross head separation rate of 2"/minute.
[2] Sample was thermoplastic and quite brittle.

The interpolymerization conditions were those described in Example I including the time, temperature, peroxide, and peroxide content.

TABLE III.—OIL EXTENDED STYRENE/BLOCK COPOLYMER RESINS

| Sample | Styrene, percent w. | Block copolymer, percent w. | Hydro-treated 400 MVI | Catalyst, percent w. | Yield strength (p.s.i.) | Tensile strength (p.s.i.) | Elongation percent at break | Hardness Shore "D" |
|---|---|---|---|---|---|---|---|---|
| G | 70 | 30 | | .1 | 3,350 | 2,200 | 170 | 57 |
| H | 63 | 27 | 10 | .09 | 2,205 | 1,640 | 270 | 57 |
| I | 63 | 27 | 10 | .18 | 2,190 | | 115 | 50 |
| J | 56 | 24 | 20 | .08 | 1,240 | 1,610 | 500 | 39 |
| K | 56 | 24 | 20 | .16 | 1,700 | 1,300 | 435 | 37 |
| L | 49 | 21 | 30 | .07 | 400 | 955 | 510 | 25 |
| M | 49 | 21 | 30 | .14 | 970 | 1,280 | 575 | 39 |
| N | 49 | 21 | 30 | .23 | 1,123 | 1,300 | 560 | 31 |
| O | 49 | 21 | 30 | .47 | 1,120 | 1,380 | 535 | 36 |
| P | 49 | 21 | 30 | .93 | 1,070 | 1,505 | 480 | 39 |
| Q | 49 | 21 | 30 | 1.87 | 790 | 1,371 | 390 | 37 |
| R | 49 | 18 | 40 | .2 | 275 | 525 | 800 | 4 |
| S | 42 | 18 | 40 | 2.0 | 315, | 830 | 475 | 25 |
| T | 35 | 15 | 50 | .2 | 15 | 383 | 433 | 13 |
| U | 35 | 15 | 50 | 1.67 | 100 | 505 | 540 | 11 |
| V | 35 | 15 | 50 | 3.0 | 65 | 430 | 465 | 10 |

Example IV

Interpolymers were formed between the block copolymer and monomeric styrene as described in Example I, the difference being the addition of varying proportions of hydroxyethyl methacrylate (HEMA) during the interpolymerization. The products obtained were tested and their physical properties reported in Table IV below.

TABLE IV.—STYRENE-HYDROXYETHYL METHACRYLATE-BLOCK COPOLYMER RESINS

| | | | | Mechanical properties | | | |
|---|---|---|---|---|---|---|---|
| | Styrene, percent w. | HEMA, percent | Block copolymer, percent w. | Yield strength (p.s.i.) | Tensile at break (p.s.i.) | Elongation percent at break | Hardness Shore "D" |
| Sample: | | | | | | | |
| 5-A | 35 | 15 | 50 | 815 | 2,865 | 150 | |
| 5-B | 49 | 21 | 30 | 1,560 | 2,205 | 115 | 57 |
| 5-C | 56 | 24 | 20 | 2,925 | 3,870 | 40 | 71 |
| 5-D | 63 | 27 | 10 | 1,830 | 2,240 | 15 | 67 |
| 5-E | 63 | 27 | 10 | 1,575 | 1,450 | 10 | 68 |

Example V

The high degree of adhesion to aluminum of the subject interpolymers was demonstrated by the data given in Table V.

TABLE V [1]

| | Composition | | | Mechanical properties | | | Adhesive properties | |
|---|---|---|---|---|---|---|---|---|
| | Styrene, percent w. | Hydroxyethyl methacrylate, percent w. | Styrene-butadiene stryene block copolymers, percent w. | Yield (p.s.i.) | Tensile (p.s.i.) | Elongation percent at break | Tensile shear (p.s.i.)[3] | Tensile peel, lb./in.[4] |
| Sample: | | | | | | | | |
| A | 50 | 16 | 34 | 2,900 | 4,100 | 67 | 2,510 | 12.6 |
| B | 52 | 18 | 30 | 3,260 | 4,200 | 56 | 2,400 | 6.9 |
| C | 56 | 20 | 24 | 4,170 | 4,750 | 35 | 3,030 | 9.9 |
| D | 58 | 24 | 18 | 4,180 | 4,480 | 19 | 2,910 | 9.0 |
| E | 58 | 17 | 25 | 3,900 | 4,220 | 56 | 3,480 | 26.0 |
| F | [2] 58 | 17 | 25 | 3,740 | 4,030 | 37 | 2,970 | 48.3 |
| G | [5] 58 | 17 | 25 | 3,690 | 3,960 | 44 | 3,230 | 12.4 |

[1] All of the samples in the above-identified table were cured at 150° C. for ½ hour with 0.5% weight dicumyl peroxide, 0.5% weight ditertiarybutyl peroxide, 0.13% weight benzoyl peroxide added as catalyst. "D" die specimens were strained at 2"/min. on Instron Testor.
[2] 3 parts/hundred added divinyl benzene.
[3] According to ASTM D1002, 0.5 in./min., Al/Al bond.
[4] 90° "T" using "Bell Jig," 25 mil Al peeled from 62 mil Al panel.
[5] Vinyl toluene.

I claim as my invention:

1. A thermosetting resinous transparent polymeric composition comprising a free radical catalytically interpolymerized solution of 20–60% by weight of a block copolymer having the general configuration

A—B—A wherein each A is a polymer block of at least one monovinyl aromatic hydrocarbon selected from the group consisting of styrene and substituted styrenes, the average molecular weight of each A being between about 5,000 and 60,000, the total blocks A making up to 2 to 40% by weight of the copolymer, and B is a polymer block of a conjugated diene selected from the group consisting of butadiene and isoprene, the average molecular weight of the block being between about 5,000 and 500,000 and 80–40% by weight of at least one monomeric monovinyl aromatic hydrocarbon selected from the group consisting of styrene and substituted styrenes.

2. A method of making a thermosetting resinous substantially transparent polymeric composition which comprises dissolving 20–60% by weight of a block copolymer having the general configuration

A—B—A wherein each A is a polymer block of at least one monovinyl aromatic hydrocarbon selected from the group consisting of styrene and substituted styrenes, the average molecular weight of each A being between about 5,000 and 60,000, the total blocks A making up to 2 to 40% by weight of the copolymer, and B is a polymer block of a conjugated diene selected from the group consisting of butadiene and isoprene, the average molecular weight of the block being between about 5,000 and 500,000 in 80–40% by weight of at least one monomeric monovinyl aromatic hydrocarbon selected from the group consisting of styrene and substituted styrenes and heating the solution so formed at temperatures between about 20° C. and 200° C. for 0.1–24 hours in the presence of an amount of a free radical catalyst to produce a thermosetting cross-linked product.

3. A polymeric composition according to claim 1 comprising as an additional interpolymerized monomer 5–30% by weight of a hydroxyalkyl ester of an acrylic acid.

4. An extended thermosetting composition comprising 99–50 parts by weight of a composition according to claim 1 and 1–50 parts by weight of a mineral oil.

5. An article of manufacture comprising a laminate of aluminum and a solid polymer of a 1-olefin having a maximum of 8 carbon atoms per molecule and no branching nearer the double bond than the 4-position bonded with a cured composition according to claim 1.

6. A method for bonding aluminum and a solid polymer of a 1-olefin having a maximum of 8 carbon atoms per molecule and no branching nearer the double bond than the 4-position which comprises interposing there between an elastic adhesive coating of a composition according to claim 1 and pressing the aluminum olefin polymer and elastic adhesive coating at a temperature exceeding the softening point of the 1-olefin polymer but not more than about 150° F. above softening point to cure said adhesive.

7. An article of manufacture comprising an aluminum surface bearing as a coating thereon a composition according to claim 1.

8. A thermosetting transparent interpolymer comprising a peroxide-cured interpolymer of styrene with 20–60% by weight of a block copolymer having the general configuration polystyrene-polybutadiene-polystyrene 9. A thermosetting interpolymer comprising a peroxide-cured interpolymer of styrene, 5–40% by weight of hydroxyethyl methacrylate and 20–60% by weight of a block copolymer having the general configuration polystyrene-polybutadiene-polystyrene 10. A composition comprising 99–50 parts by weight of the interpolymer of claim 3 and 1–50 parts by weight of a mineral oil.

References Cited

UNITED STATES PATENTS

| | | | |
|---|---|---|---|
| 3,231,635 | 1/1966 | Holden et al. | 260—879 |
| 3,239,478 | 3/1966 | Harlan | 161—217 |
| 3,264,374 | 3/1966 | Jones | 260—880 |
| 3,265,765 | 8/1966 | Holden et al. | 260—880 |

MORRIS LIEBMAN, Primary Examiner

R. BARON, Assistant Examiner

U.S. Cl. X.R.

117—132; 161—217; 260—878, 879, 880